United States Patent
Fang

(10) Patent No.: US 10,861,492 B2
(45) Date of Patent: Dec. 8, 2020

(54) MULTI-BIT OPTICAL COMPUTING SYSTEM

(71) Applicant: Ko Cheng Fang, Taipei (TW)

(72) Inventor: Ko Cheng Fang, Taipei (TW)

( * ) Notice: Subject to any disclaimer, the term of this patent is extended or adjusted under 35 U.S.C. 154(b) by 0 days.

(21) Appl. No.: 16/545,310

(22) Filed: Aug. 20, 2019

(65) Prior Publication Data

US 2020/0335130 A1    Oct. 22, 2020

(30) Foreign Application Priority Data

Apr. 17, 2019   (TW) .............................. 108113392 A

(51) Int. Cl.
| | | |
|---|---|---|
| *G11B 20/10* | (2006.01) | |
| *G11B 7/125* | (2012.01) | |
| *G11B 7/0045* | (2006.01) | |
| *H04B 10/66* | (2013.01) | |
| *H04B 10/50* | (2013.01) | |

(52) U.S. Cl.
CPC ............ *G11B 7/125* (2013.01); *G11B 7/0045* (2013.01); *H04B 10/502* (2013.01); *H04B 10/66* (2013.01)

(58) Field of Classification Search
CPC .... G11B 20/10527; G11B 2020/10592; G11B 2020/10601; G11B 2020/1062; G11B 27/034; G11B 20/10027
USPC ......... 369/47.15, 47.2, 47.26, 60.01, 124.09, 369/124.13
See application file for complete search history.

(56) References Cited

U.S. PATENT DOCUMENTS

| | | | |
|---|---|---|---|
| 6,963,677 B1 | 11/2005 | Spickermann et al. | |
| 8,032,033 B2 | 10/2011 | Binkert et al. | |
| 9,191,122 B2 * | 11/2015 | Yagisawa | ............. G02B 6/4286 |
| 2006/0204247 A1 | 9/2006 | Murphy | |
| 2013/0177323 A1 | 7/2013 | Kim et al. | |
| 2015/0207563 A1 | 7/2015 | Cho et al. | |
| 2017/0167920 A1 | 6/2017 | Lee et al. | |

FOREIGN PATENT DOCUMENTS

| | | |
|---|---|---|
| CN | 2583699 | 10/2003 |
| TW | I407085 | 9/2013 |
| TW | M488809 | 10/2014 |
| TW | M488809 U | 10/2014 |
| TW | 201642603 | 12/2016 |
| TW | 201721112 | 6/2017 |

OTHER PUBLICATIONS

TIPO; Office Action dated Dec. 13, 2019 in Application No. 108113392.

* cited by examiner

*Primary Examiner* — Nabil Z Hindi
(74) *Attorney, Agent, or Firm* — Snell & Wilmer L.L.P.

(57) ABSTRACT

A multi-bit optical computing system includes an optical source module for generating multi-frequency optical signals. An optical information storage module receives each of the multi-frequency optical signals through an optical path module, and stores them as a plurality of optical information. An optical processing module receives each of the optical information in the optical information storage module via the optical path module according to an external command, generates a plurality of output information, and stores the output information through the optical path module to the optical information storage module.

7 Claims, 5 Drawing Sheets

MULTI-BIT OPTICAL COMPUTING SYSTEM

CROSS REFERENCE TO RELATED APPLICATIONS

This application claims priority to and incorporates by reference Taiwan Patent Application No. 108113392, which was filed on Apr. 17, 2019.

BACKGROUND OF THE INVENTION

1. Field of the Invention

The invention relates to a computing system and, in particular, to a multi-bit optical computing system.

2. Description of Related Art

Existing electronic computers transmit information by using two digital potential signals consisting of a low-voltage signal representing "0" and a high-voltage signal representing "1," and includes a storage module and a processing module. The storage module converts an input digital signal for solid-state information storage. The processing module reads the solid-state information from the storage module, and performs complex operation commands composed of arithmetic operations and comparison operations.

Since the current electronic computer uses the voltage signals for signal transmissions and computations, only a single sequence of potential signals can be transmitted at a time in a single circuit channel. The processing module also can only receive a set of potential signals for operations to obtain a single computing result. Its computing speed is thus limited.

Besides, although quantum computers are currently under development for high-speed computations, they are facing the challenges of two prerequisites: quantum superposition and quantum entanglement. At the same time, they have to be running at an extremely low temperature close to the absolute zero. These conditions result in exceedingly high costs of quantum computers, making commercialization rather difficult.

SUMMARY OF THE INVENTION

In view of the foregoing, the invention provides a multi-bit optical computing system that includes an optical source module, an optical path module, an optical information storage module, and an optical processing module.

The optical source module generates a light signal which includes optical signals of different frequencies. The optical path module includes an input terminal, which is connected to the optical source module to receive the optical signal. The optical information storage module receives the optical signal via the optical path module. The optical information storage module includes a plurality of storage units, each of which respectively receives one of the multi-frequency optical signals and stores the signal as optical information. The optical processing module is connected to the optical information storage module via the optical path module, and receives an external command. The optical processing module further accesses the optical information stored in each of the storage units from the optical information storage module according to the external command. Each piece of the optical information is subject to a command operation to generate a plurality of output information. The output information is then transmitted to each of the storage units of the optical information storage module via the optical path module.

When transmitting the optical signals generated by the optical source module, the optical path module transmits a plurality of frequency optical signals of different frequencies, and stores the respective optical signals in the respective storage units of the optical information storage module. In other words, each of the storage units stores optical information carried in optical signals of different frequencies. When the optical processing module accesses the optical information via the optical information storage module, different optical information in the storage units is accessed at the same time. Since the optical information is carried by optical signals of different frequencies, the processing thereof does not interfere with each other. Thus, the optical processing module can simultaneously access different optical information. And the optical processing module performs synchronous operations on the optical information of different frequencies, and further sends out output information carried by optical signals of different frequencies.

Compared with the existing computer system, the multi-bit optical computing system can simultaneously transmit multiple pieces of information in different frequencies through the optical path module, thereby enabling the optical processing module to receive multiple pieces of information at the same time to improve the overall computing performance thereof. In addition, the invention utilizes the optical path module to convert the data into optical signals, achieved without requiring strict conditions. The manufacturing and running costs are lower than those of quantum computers.

DETAILED DESCRIPTION OF THE PREFERRED EMBODIMENT

Figure 1:
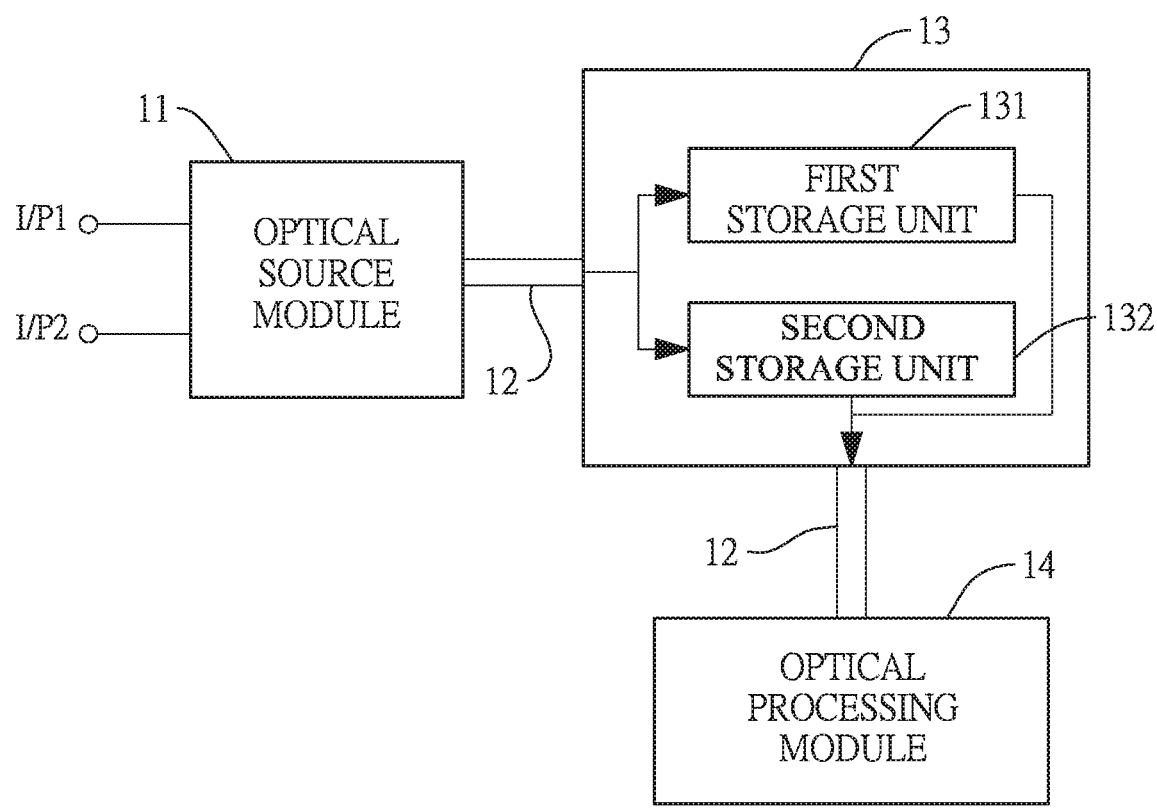
FIG. 1 is a schematic block diagram of the multi-bit optical computing system.

A preferred embodiment of the multi-bit optical computing system according to the present invention is described as follows. As shown in FIG. 1, the multi-bit optical computing system includes an optical source module 11, an optical path module 12, an optical information storage module 13, and an optical processing module 14. Preferably, the optical source module 11 generates optical signals of a plurality of frequencies, for example a first frequency optical signal and a second frequency optical signal. The optical path module 12 includes an input terminal connected to the optical source module 11 for receiving the first frequency optical signal and the second frequency optical signal. The optical information storage module 13 receives the first frequency optical signal and the second frequency optical signal through the optical path module 12. The optical information storage module 13 includes a plurality of storage units, for example a first storage unit 131 and a second storage unit 132. The first storage unit 131 receives and stores the first frequency optical signal as first information, and the second storage unit 132 receives and stores the second frequency optical signal as second information. The module 14 is connected to the optical information storage module 13 via the optical path module 12 and receives an external command. The optical processing module 14 accesses the first information and the second information in the optical information storage module 13 according to the external command, and performs a command operation on the first information and the second information to generate first output information and second output information. The first output information and the second output information are transmitted via the optical path module 12 to be stored in the first storage unit 131 and the second storage unit 132 of the optical information storage module 13.

In a first preferred embodiment of the invention, the multi-bit optical computing system includes an optical path board, on which the optical path module 12 is formed. The optical path module 12 is formed on the optical path board by a photolithography and laser processes.

The optical path of the invention is manufactured by first providing a layer of photoresist material on the optical path board. Afterwards, development imaging forms a pattern on the photoresist material on the optical path board. Laser processing is done on the portion of the optical path board that is not covered by the photoresist material, rendering an optical path. Preferably, the optical path board is a silicon substrate, a glass substrate, or a plastic glass substrate.

Since the optical path module 12 on the optical path board can simultaneously transmit optical signals of multiple frequencies, the first frequency optical signal and the second frequency optical signal can be simultaneously transmitted to the next destination through the optical path module 12, such as the optical information storage module 13 or the optical processing module 14. In other embodiments, the optical source module 11 can also generate more optical signals of different frequencies according to external input information. In this case, the optical processing module 14 can simultaneously access multiple data to reduce access time, and further improving the overall processing speed of the multi-bit optical computing system.

For example, in the case of visible light, signals of different frequencies are carried by light of different colors. And light of different colors can simultaneously pass through the optical path module 12 on the optical path board. As an example, red light signal, orange light signal, and yellow light, green light signal and blue light signal respectively represent optical signals of five different frequencies. The optical path module 12 on the optical path board allows the red light signal, the orange light signal, the yellow light signal, the green light signal and the blue light signal to simultaneously pass. Therefore, the optical processing module 14 can simultaneously access optical signals of five different frequencies. The optical signals of five different frequencies respectively have five different kinds of optical information. Hence, the amount of data that can be simultaneously accessed by the optical processing module 14 is increased by a factor of five, thereby reducing access time and speeding up the overall processing speed.

In addition, the signals are transmitted through the optical path module 12 on the optical path board. No electrical power is required in the process of signal transmission, and there is thus no power loss during the signal transmission. As a result, the overall power consumption is more economical. Only a small amount of electrical power is required to maintain normal operations. Therefore, the multi-bit optical computing system can use a solar cell as the power supply source, converting solar power into electrical energy for use. Since there is not much power consumption, the electrical power supplied by the solar cell can maintain the normal operations of the multi-bit optical computing system. The solar cell can be replenished by illuminating light at any time. Therefore, the multi-bit optical computing system can operate for a long time without being charged.

Preferably, the optical processing module 14 is composed of a plurality of light control switches, each of which has two connection terminals and a control terminal. When the control terminal receives a control optical signal, optical signals are allowed to pass between the two connection terminals of the light control switch. Preferably, each of the light control switches comprises a photoresist unit and a photosensitive unit.

Figure 2:
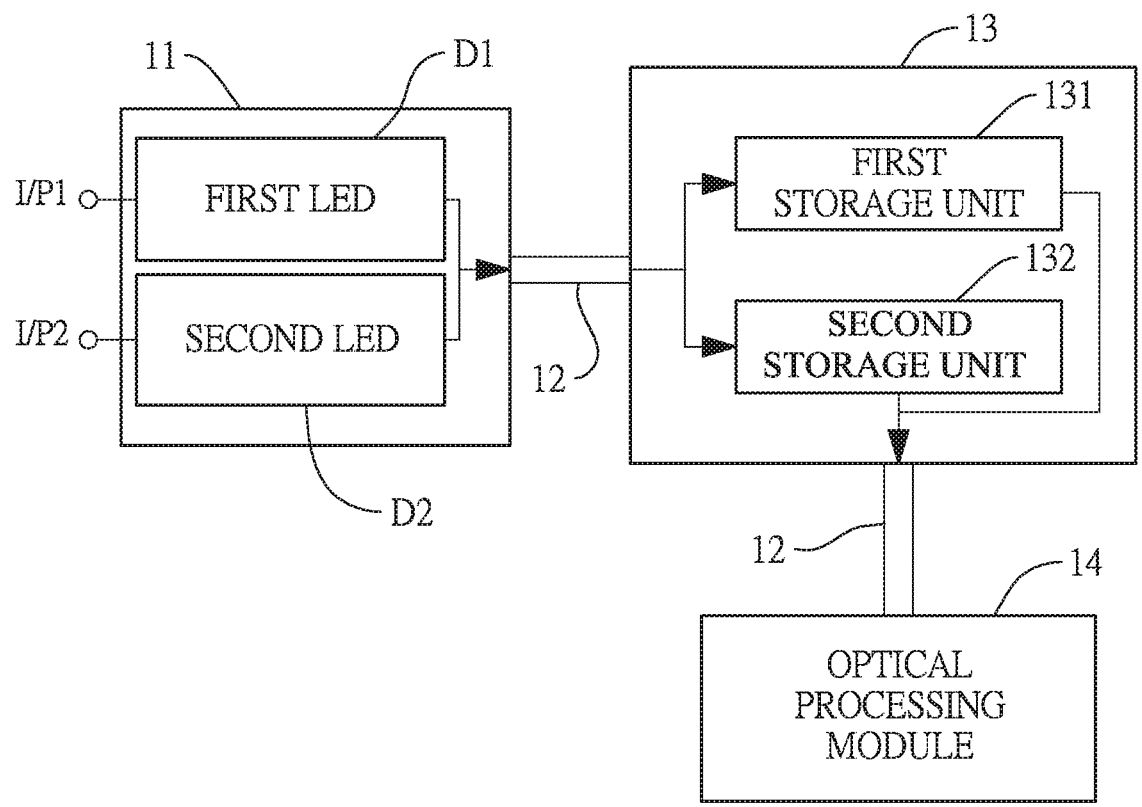
FIG. 2 is a schematic block diagram showing a second preferred embodiment of the multi-bit optical computing system.

Please refer to FIG. 2. In a second preferred embodiment of the invention, the optical source module 11 includes a plurality of light-emitting diodes (LEDs), each of which receives a control signal and generates a frequency optical signal accordingly. For example, the optical source module 11 includes a first LED D1 and a second LED D2. The first LED D1 receives a first control signal from a first signal input terminal I/P1, and generates the first frequency optical signal accordingly. The second LED D2 receives a second control signal from a second signal input terminal I/P2, and generates the second frequency optical signal accordingly. The first frequency optical signal and the second frequency optical signal are respectively binary digital signals.

Figure 3:
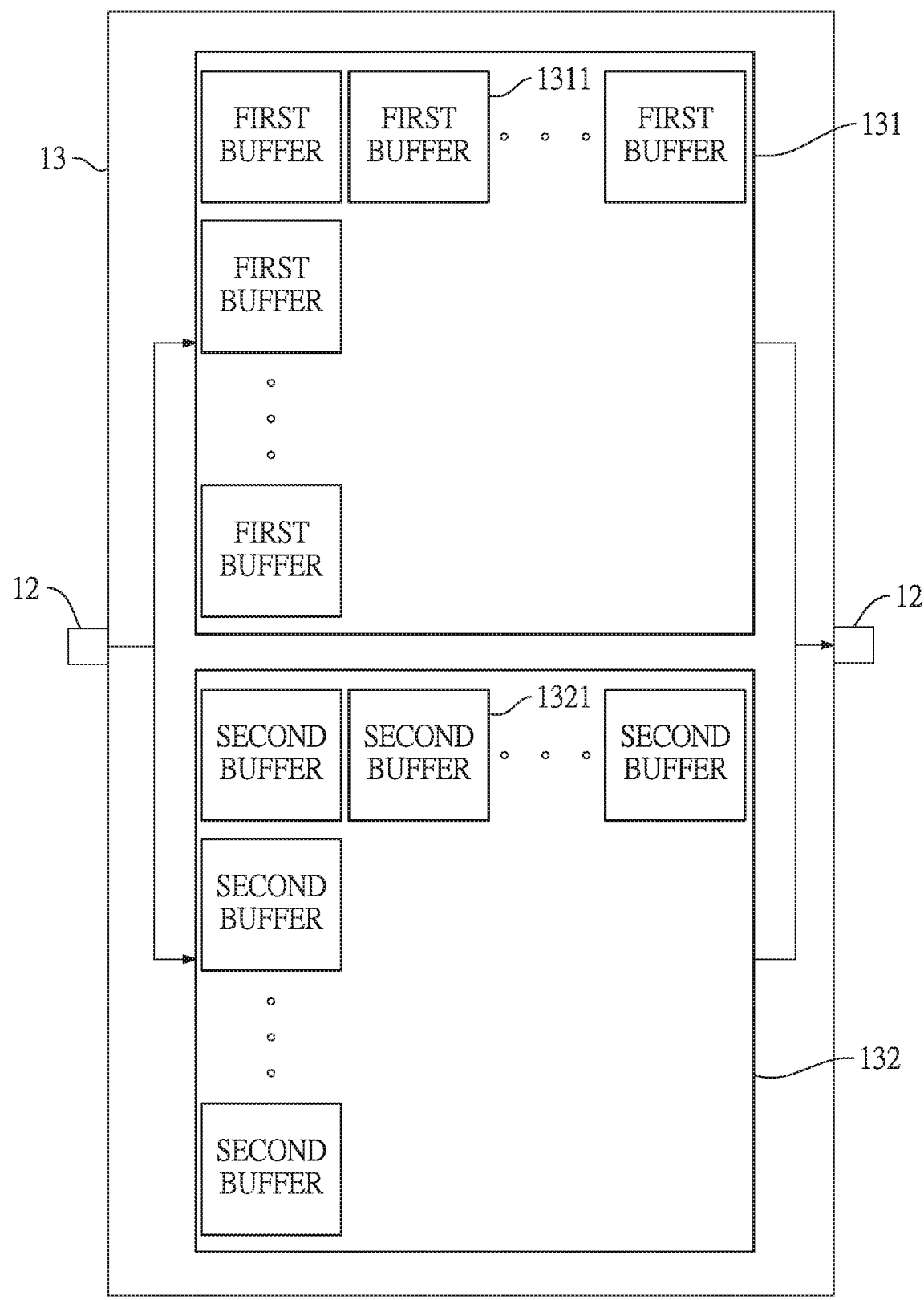
FIG. 3 is a schematic block diagram showing a third preferred embodiment of the multi-bit optical computing system.

Please refer to FIG. 3. In a third preferred embodiment of the present invention, each of the storage units of the optical information storage module 13 includes a plurality of buffers, each of which has an absorb state and a pass state for storing one bit of data. For example, the first storage unit 131 of the optical information storage module 13 includes a plurality of first buffers 1311, each of which has an absorb state and a pass state. The second storage unit 132 includes a plurality of second buffers 1321, each of which also has an absorb state and a pass state. When the first storage unit 131 receives the first frequency optical signal and when each of the first buffers 1311 or each of the second buffers 1321 is in the absorb state, the optical signals entering the first storage unit 131 are absorbed. When each of the first buffers 1311 or each of the second buffers 1321 is in the pass state, the optical signals entering the first buffers 1311 or the second buffers are allowed to pass. Each of the first buffers 1311 sequentially receives the bits of the first frequency optical signal, and accordingly switches to the absorb state or the pass state. Each of the second buffers 1321 sequentially receives the bits of the second frequency optical signal, and accordingly switched to the absorb state or the pass state. In this manner, the first storage unit 131 and the second storage unit 132 store the first optical frequency signal and the second optical frequency signal as first information and second information, respectively. According to a command signal, the optical processing module 14 reads from the first buffers 1311 and the second buffers 1321 the states thereof, and receives the first information and the second information.

Figure 4:
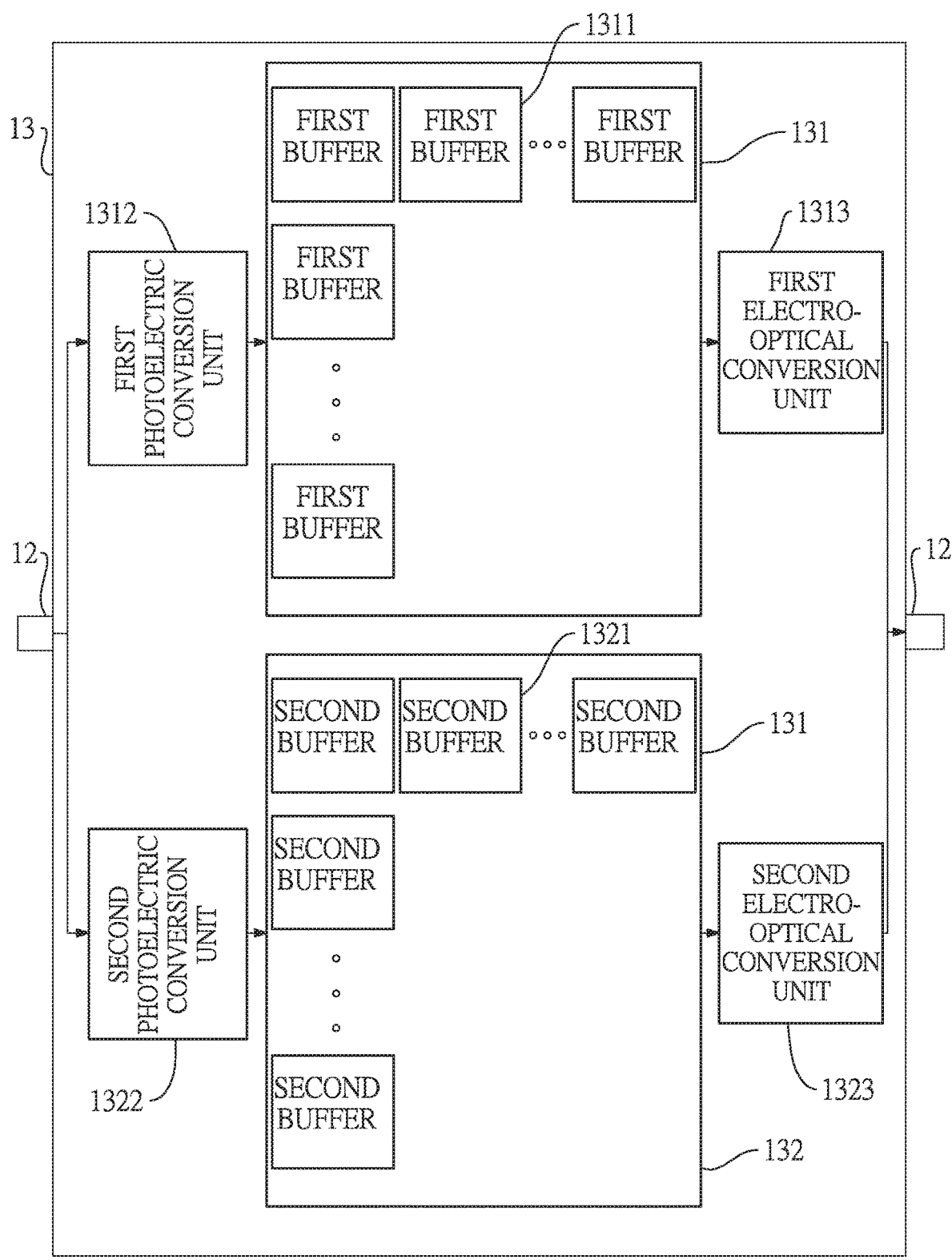
FIG. 4 is a schematic block diagram showing a fourth preferred embodiment of the multi-bit optical computing system.

Please refer to FIG. 4. In a fourth preferred embodiment of the invention, each of the storage units of the optical information storage module 13 includes a plurality of buffers, a photoelectric conversion unit, and an electro-optical conversion unit. The buffers of each of the storage units are connected to the optical source module through the photoelectric conversion unit and the optical path module. The photoelectric conversion unit converts the optical signal of one frequency into an electrical signal to be stored in each of the buffers. Moreover, the buffers of each of the storage units are connected to the optical processing module through the electro-optical conversion unit and the optical path module. The electro-optical conversion unit converts the electrical signals stored in each of the buffers into the optical signals for the optical processing module 14 to access. For example, the first storage unit 131 of the optical information storage module 13 further includes a first photoelectric conversion unit 1312 and a first electro-optical conversion unit 1313, and the second storage unit 132 further includes a second photoelectric conversion and a second electro-optical conversion unit 1323. In the preferred embodiment, each of the first buffers 1311 and the second buffers 1321 is a cache memory.

Each of the first buffers 1311 is connected to the optical source module 11 through the first photoelectric conversion unit 1312 and the optical path module 12, for converting the first frequency optical signal into a first electrical signal to be stored in each of the first buffers 1311. Each of the first buffers 1311 is connected to the optical processing module 14 through the first electro-optical conversion unit 1313 and the optical path module 12, for converting the first electrical signal stored in each of the first buffers 1311 into the first information for the optical processing module 14 to access.

Likewise, each of the second buffers 1321 is connected to the optical source module 11 through the second photoelectric conversion unit 1322 and the optical path module 12, for converting the second frequency optical signal into a second electrical signal to be stored in each of the second buffers 1321. Each of the second buffers 1321 is connected to the optical processing module 14 through the second electro-optical conversion unit 1323 and the optical path module 12, for converting the second electrical signal stored in each of the second buffers 1321 into the second information for the optical processing module 14 to access.

Figure 5:
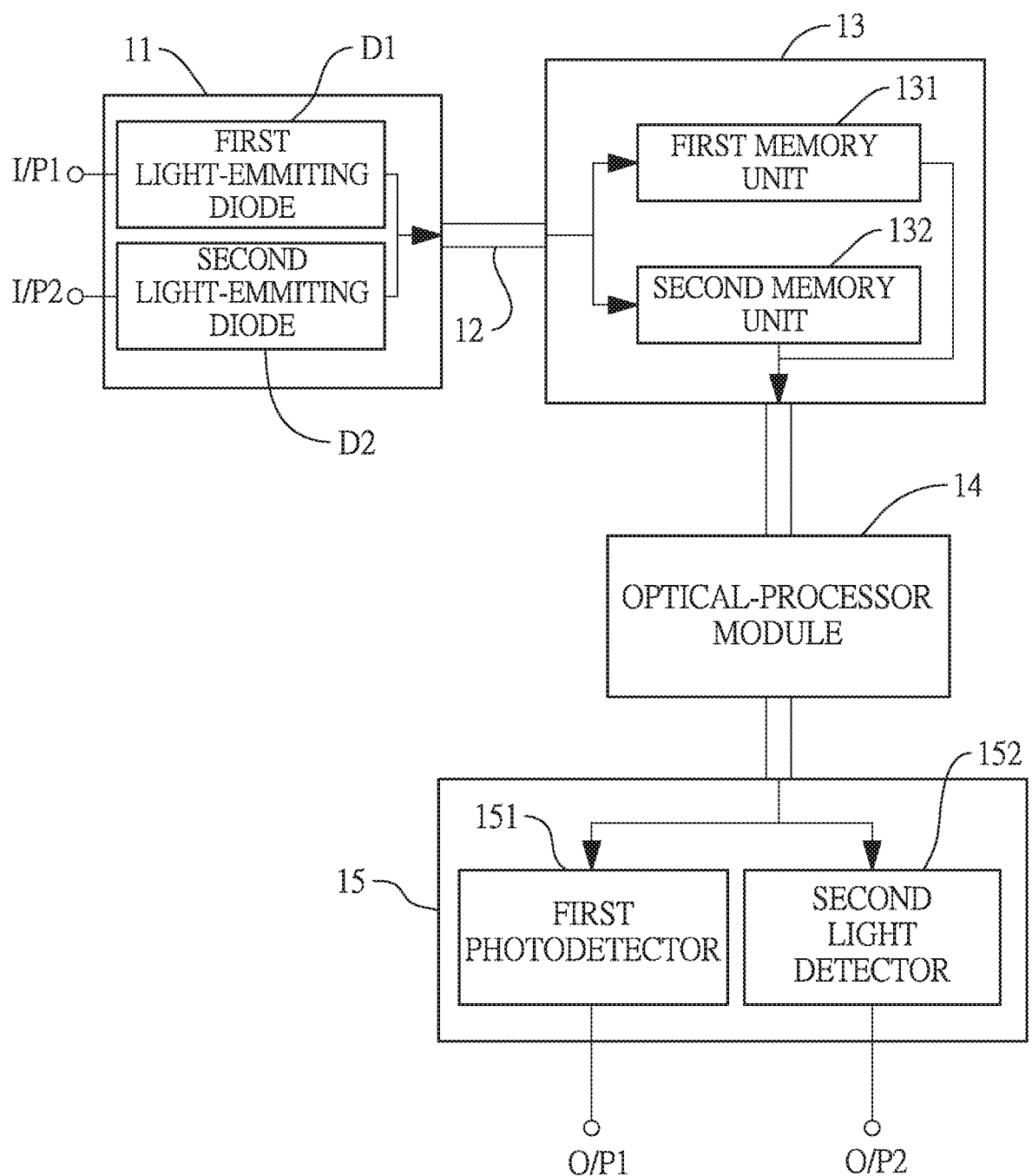
FIG. 5 is a schematic block diagram showing a fifth preferred embodiment of the multi-bit optical computing system.

Please refer to FIG. 5. In a fifth preferred embodiment of the invention, the multi-bit optical computing system further includes a photoelectric conversion module 15 disposed on the optical path board and connected to the optical path module 12. The photoelectric conversion module 15 has a plurality of photodetectors, each of which is connected to the optical path module 12. Each of the photodetectors respectively receives one of the frequency optical signals, and generates digital information accordingly. For example, the photoelectric conversion module 15 includes a first photodetector 151 and a second photodetector 152. The first photodetector 151 receives the optical signals from the optical path module 12, generates first digital information according to the first frequency optical signal, and outputs the first digital information via a first output terminal O/P1. The second photodetector 152 receives the optical signals from the optical path module 12, generates second digital information according to the second frequency optical signal, and outputs the second digital information via a second output terminal O/P2. The photoelectric conversion module 15 is configured to integrate the optical computing system with the electronic computer system of the prior art. It converts the first frequency optical signal and the second frequency optical signal in the optical computing system into digital information based on voltage changes, and output the digital information to a subsequent electrical signal processing module for better applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-bit optical computing system, comprising:
   an optical source module for generating a light signal that contains optical signals of different frequencies;
   an optical path module, having an input terminal connected to the optical source module to receive the optical signals;
   an optical information storage module for receiving the optical signals via the optical path module and containing a plurality of storage units, each of storage units receives one of the optical signals to be stored as optical information; and
   an optical processing module connected to the optical information storage module via the optical path module and receiving an external command;
   wherein the optical processing module accesses the optical information in each of the storage units from the optical information storage module according to the external command, performs a command operation on the optical information, and outputs a plurality of output information; and each piece of the output information is transmitted by the optical path module to each of the storage unit of the optical information storage module for storage;
   an optical path board, wherein the optical path module is formed on the optical path board through a photolithography and laser process or an etching process.

2. The multi-bit optical computing system of claim 1, wherein the optical path board is a silicon substrate, a glass substrate or a plastic glass substrate.

3. The multi-bit optical computing system of claim 1, further comprising a photoelectric conversion module disposed on the optical path board, the photoelectric conversion module containing a plurality of photodetectors connected to the optical path module, with the photodetectors respectively receiving the optical signals and respectively generating digital information accordingly.

4. The multi-bit optical computing system of claim 1, wherein
   the optical processing module comprises a plurality of light control switches, each of which has two connection terminals and a control terminal; wherein when the control terminal of one of the light control switches receives a control optical signal, between the two connection terminals of the light control switch is in a pass state; and
   each of the light control switches comprises a photoresist unit and a photosensitive unit.

5. The multi-bit optical computing system of claim 1, wherein the optical source module includes a plurality of light-emitting diodes, each of which receives a control signal to generate the optical signal with frequency accordingly; wherein each of the optical signals is a binary digital signal.

6. The multi-bit optical computing system of claim 1, wherein each of the storage units of the optical information storage module includes a plurality of buffers, each of the buffers has an absorb state and a pass state.

7. The multi-bit optical computing system of claim 1, wherein each of the storage units of the optical information storage module includes:

a plurality of buffers;
a photoelectric conversion unit, wherein each of the buffers is connected to the optical source module via the photoelectric conversion unit and the optical path module, and the photoelectric conversion unit converts the optical signal into an electrical signal to be stored in the buffers; and
an electro-optical conversion unit, wherein each of the buffers is connected to the optical processing module via the electro-optical conversion unit and the optical path module, and the electro-optical conversion unit converts the electrical signals stored in each of the buffers into the optical information.

\* \* \* \* \*